United States Patent

Christie

[15] 3,671,722

[45] June 20, 1972

[54] TRANSITION CODE RECOGNITION SYSTEM

[72] Inventor: John B. Christie, Kettering, Ohio

[73] Assignee: The National Cash Register Company, Dayton, Ohio

[22] Filed: June 30, 1969

[21] Appl. No.: 837,850

[52] U.S. Cl. ............235/61.12 N, 235/61.11 E, 340/146.3 K

[51] Int. Cl. ....................G06k 7/10, G06k 9/18, G06k 19/06

[58] Field of Search ..............235/61.12, 61.115; 340/149 A, 340/146.3 K; 194/4; 186/1; 179/2 CA, 6.3 CC; 283/6, 7

[56] References Cited

UNITED STATES PATENTS

| | | | |
|---|---|---|---|
| 3,106,706 | 10/1963 | Kolanowski et al. | 235/61.11 E X |
| 3,145,291 | 8/1964 | Brainerd | 235/61.11 E |
| 3,225,175 | 12/1965 | Hyypolainen | 235/61.7 R |
| 3,284,929 | 11/1966 | Azure | 235/61.6 H |
| 3,417,231 | 12/1968 | Stites et al. | 235/61.11 E |

*Primary Examiner*—Daryl W. Cook
*Assistant Examiner*—Thomas J. Sloyan
*Attorney*—Louis A. Kline, Albert L. Sessler, Jr. and Elmer Wargo

[57] ABSTRACT

A transition code recognition system which includes a coded record medium (like a color-coded label) which may, if desired, be secured to an article. The record medium utilizes detectable indicia like color bands placed on the record medium in a reading order so that each color band is different from the preceding one. The color transitions from one color band to the next, when reading, are used to identify binary states "1" and "0," and the transitions obviate the need for a separate clocking arrangement. An optical probe scanner is used to read the record medium by "scribing" or gliding the probe scanner across the color bands, and the changing light signals resulting from the reading operation are routed to electronic circuitry for interpretation and processing.

11 Claims, 12 Drawing Figures

INVENTOR
JOHN B. CHRISTIE

BY Louis A. Kline
Albert L. Sessler
Elmer Wargo
HIS ATTORNEYS

INVENTOR
JOHN B. CHRISTIE
BY Louis A. Kline
Albert L. Sessler
Elmer Wargo
HIS ATTORNEY

INVENTOR
JOHN B. CHRISTIE

BY *Louis A Kline*
*Albert K Sessler Jr*
*Elmer Wargo*

HIS ATTORNEYS

INVENTOR
JOHN B. CHRISTIE
BY Louis A Kline
Albert L Sessler
Elmer Wargo
HIS ATTORNEYS

TRANSITION CODE RECOGNITION SYSTEM

This application is related to the subject matter disclosed in a first copending U.S. Pat. application, Ser. No. 765,528, filed on Oct. 7, 1968, by Messrs. Clarence W. Kessler, Frank S. C. Mo, Ollah Combs, and Larry D. Miller, which said application has been assigned to the assignee of the present application.

This application is related to a second copending U.S. Pat. application Ser. No. 837,514 filed on the same date as this application by Messrs. John B. Christie, Dzintars Abuls, and Wilfridus G. van Breukelen and entitled "Transition Code Recognition System," said second application being assigned to the assignee of the present application.

BACKGROUND OF THE INVENTION

This invention relates to a transition code recognition system including a coded record medium and the method of making the same. The record medium may be used in semi-automatic, mark-sensing systems for check-out counter applications in super-markets and retail stores, and in credit card and inventory control applications and the like. In the embodiment disclosed herein, the coded record medium is read by a hand-held, optical probe scanner which is "scribed" across the record medium.

Automated sensing systems, like those which may be used for check-out systems, are not new. However, these systems require complex, expensive, electronic equipment to provide for the reading of labels secured to articles which may be oriented in a random manner when passing a check-out station. One such system is shown in U.S. Pat. No. 3,246,126, which issued Apr. 12, 1966, on the application of Ernest W. Schlieben et al.

Color-coded labels used in identification systems which are also complex are shown in U.S. Pat. No. 3,145,291, which issued Aug. 18, 1964, on the application of Henry Bowen Brainerd, and in U.S. Pat. No. 3,225,177, which issued Dec. 21, 1965, on the application of Francis H. Stites and Raymond Alexander. An optical scanning probe or pen is shown in U.S. Pat. No. 3,238,501, which issued Mar. 1, 1966, on the application of Stephen M. F. Mak et al. and is assigned to the assignee of the present invention. Another optical scanning pen is shown in U.S. Pat. No. 3,417,234, which issued Dec. 17, 1968, on the application of Gunnar E. Sundblad While the optical data sensing system disclosed in said first copending application is an improvement in the art, the coded record medium used therein has been improved upon by the present invention.

The coded record medium of the instant invention uses transitions of color, in one embodiment, to define a binary logic state like a "1" or "0" rather than use a first color to always define a first binary state and a second color to always define a second binary state, as is generally done in the prior art. The use of transitions of color, as is done in the instant application, obviates the need for a separate clocking arrangement on the record medium, which use effects a considerable reduction in the physical size of the record medium used when compared to those of the prior art.

The record medium of this invention may also be used in a mark-sensing system employing a probe scanner of the type disclosed in said first copending United States patent application. With the probe scanner, the related electronic circuitry used in the system is simplified, thereby lowering the cost of the system. The probe scanner can be maneuvered to where the record media or labels are located, whereas, in mark-sensing systems employing a fixed automatic scanner, the record media must be moved to the automatic scanner. When the record media are attached to oddly-shaped or clumsy items, it is difficult to move these items to the automatic scanner. The record medium of the instant invention may also be secured to a non-flat surface of an article and read by the probe scanner while secured thereto; this is a decided advantage when the record medium is attached to articles of different sizes and shapes, as are encountered in retail merchandising, for example. The record medium of the present invention may be read from more than one direction and is not restricted to a fixed tag size with a specific number of bits of data, as is generally the case with an automatic scanner. The record medium of the instant invention is economical and can be printed by ordinary printing methods.

SUMMARY OF THE INVENTION

This invention relates to a transition code recognition system including a coded record medium and the method of making the same.

The record medium of this invention includes a plurality of different indicia means, with each one of said indicia means having detectable characteristics associated therewith. These indicia means are assigned to predetermined pair groupings, so that each of said pair groupings contains two different indicia means. Some of the pair groupings are assigned to a first group, so that a transition from the first to the second indicia means of any pair grouping in the first group in a reading direction is indicative of a first datum (like a binary "1"). The remainder of the pair groupings are assigned to a second group, so that a transition from the first to the second indicia means of any pair grouping in the second group in the reading direction is indicative of a second datum (like a binary "0"). The indicia means are then arranged on said record medium in a predetermined reading order to provide the transitions corresponding to the first and second data to be applied to the record medium. The indicia means are also arranged on said record medium in said predetermined reading order so that the next one of the indicia means in the reading order is always different from the preceding one of the indicia means. The indicia means shown in the embodiment disclosed herein include bands of color having distinct spectral characteristics. While the indicia means used to illustrate the invention are bands of color in the visible spectrum, the indicia means may also have spectral characteristics in the invisible range, like infra-red. In addition, the indicia means used may employ an energy medium other than light, as, for example, sound. Magnetic markings on a record medium may also be used. The sensors used to read these different indicia means may be conventional.

The transition code recognition system of this invention also includes a reading device for reading the record medium and circuit means for interpreting and processing the information received from the reading device. The reading device may be an optical scanning probe of the type shown in said first copending United States patent application, and the scanning probe is not, in itself, a part of this invention. Additional details of the processing circuitry used with the record medium of this invention may be found in said second copending United States patent application.

DESCRIPTION OF THE PREFERRED EMBODIMENT

Figure 1:
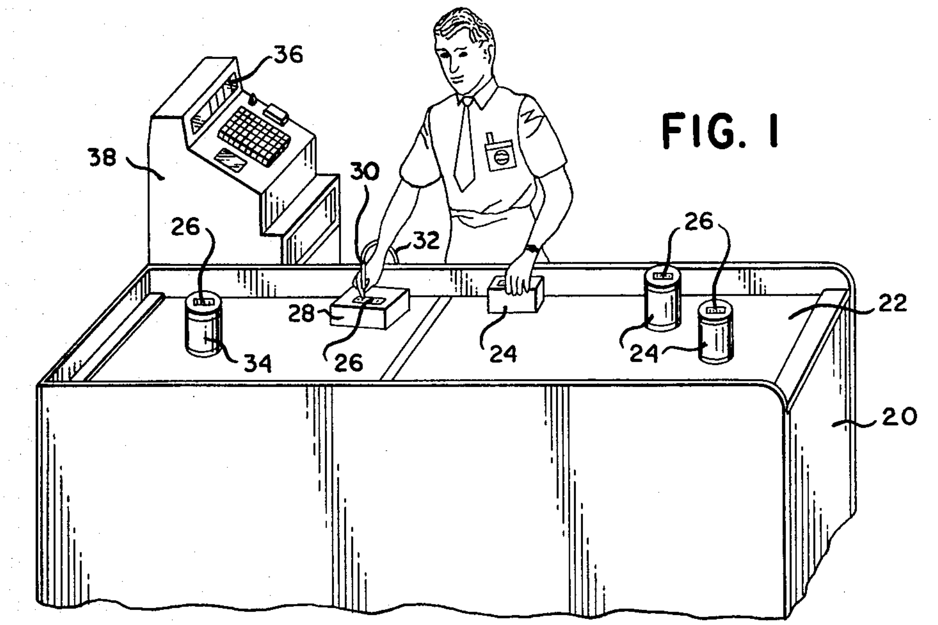
FIG. 1 is a general view, in perspective, of the code recognition system of this invention being used in a typical application like a check-out counter application. The record medium of this invention is shown attached to the items being sold, and a probe scanner is used to read the record media.

FIG. 1 is a general view, in perspective, of the code recognition system of this invention being used in a typical application at a check-out counter, it being understood that this invention may be used for other applications, as previously mentioned.

The check-out counter in FIG. 1 includes a counter 20 having thereon a moving conveyor belt 22, which transports a plurality of items 24 towards the operator shown. Each of the items 24 has its own record medium or label 26 attached thereto, and specific data relating to each item appears in coded form on the label. The specific code used on the labels 26 will be discussed hereinafter.

The operator in FIG. 1 is shown in the process of reading the data on a label 26 which is secured to an item marked 28. To read the data on a label 26, the operator holds a probe 30 in his hand, as one would hold a pen, and "scribes," or glides, a reading end of the probe from one end of the label, across the length of the label, to its opposite end. A cable 32 is secured to one end of the probe 30, which end is opposite to its reading end. The data from the label 26 which is attached to an item 24 has already been read. As the labels 26 are read, at least part of the data therein (like the price of the item) is visually recorded at the display window 36 of a cash register 38 or a conventional display device which may be used in handling payment for the items, and which cash register may be conventionally driven by the information obtained from the label 26.

Figure 2:
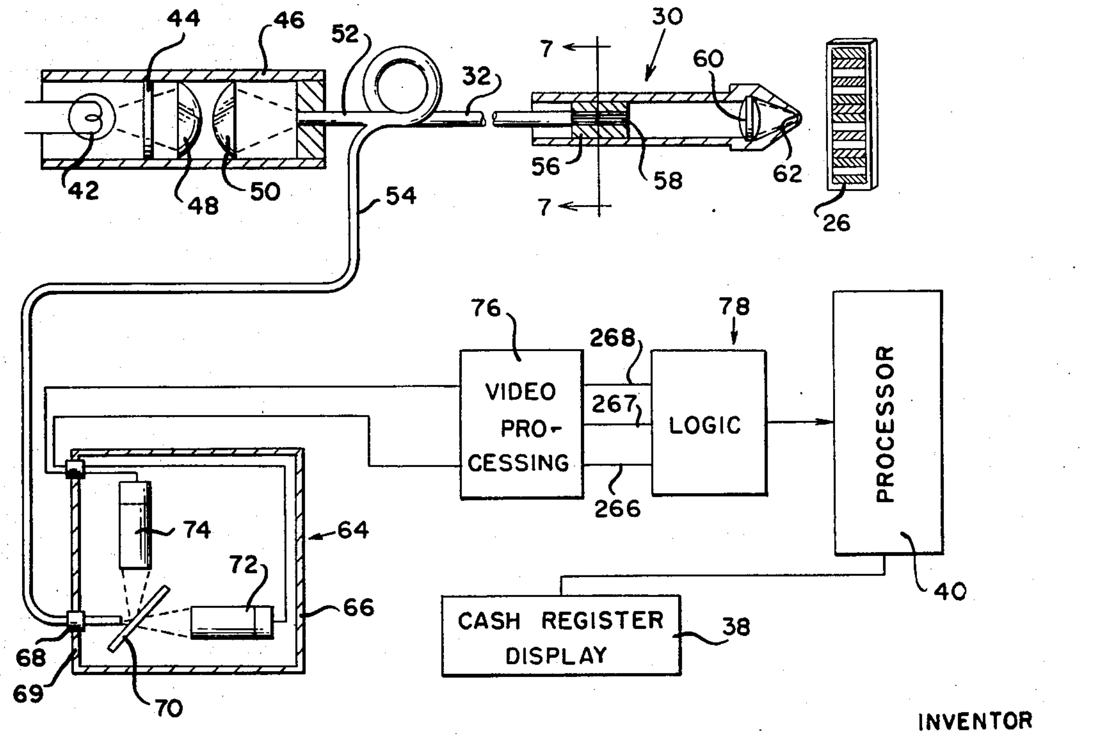
FIG. 2 is a general schematic view showing the general relationship of the record medium, the probe scanner, and the means for converting the coded data on the record medium into electrical signals which may be used by a processor like a computer.

FIG. 2 shows the general arrangement of the label 26, probe means including the probe 30, and transducer means for converting the coded data on the label into electrical signals which are used by the processor 40, which may be a calculator. The probe means includes a light source 42, whose rays may pass through an appropriate filter 44 for the optical system selected, which filter is mounted in a housing 46. From the filter 44, the light rays pass through conventional condensing lenses 48 and 50 (also mounted in the housing 46), so as to direct the rays onto the ends of a first bundle 52 of light pipes or optic fibers. This first bundle 52 of optic fibers is housed in the common cable 32, having a light-proof, abrasion-resistant cover which also houses a second bundle 54 of light pipes or optic fibers. The first bundle 52 of optic fibers has a conventional, light-proof, abrasion-resistant cover protecting the fibers for that length not housed in the cable 32, and the same is true of the second bundle 54 of optic fibers.

The first and second bundles 52 and 54 (FIG. 2), respectively, of optic fibers included in the cable 32 operate as follows. The cable 32 is secured in one end of the probe 30 by a coupling member 56, which may be adjustably positioned along the length of the probe. The ends of the optic fibers of both the first and second bundles 52 and 54, respectively, terminate in a plane 58, which is perpendicular to the optical axis of the probe 30. Light passing through the first bundle 52 of the optic fibers passes through an imaging lens 60 and is directed out of the reading end 62 of the probe 30 onto the label 26. As the reading end 62 of the probe 30 contacts and is scribed across the label 26 in reading relationship therewith, light reflected therefrom passes through the reading end 62 and the lens 60 and is brought to focus on the second bundle 54 of optic fibers at the plane 58. Details relating to the transition codes used on the label 26 will be described in detail hereinafter in relation to FIG. 3. For the present, it is sufficient to state that the transition codes appear (in one embodiment) in the form of red stripes or bands and black stripes in various combinations on a white background on the label 26. The changing light patterns, reflected back into the reading end 62 of the probe 30 as the label is read, are routed by the second bundle 54 of optic fibers to the transducer means, designated generally as 64 (FIG. 2).

The transducer means 64 (FIG. 2) includes an opaque, light-proof housing 66 having a light-proof coupling member 68 in one wall 69 thereof. The coupling member 68 is used to secure the second bundle 54 of optic fibers to the housing 66. The end of the second bundle 54 of optic fibers is directed at a dichroic mirror 70, which is positioned at an angle of forty-five degrees relative to the longitudinal axis of the bundle 54. Part of the light of the second bundle 54 of optic fibers is transmitted through the dichroic mirror 70 to impinge upon a photoresponsive member 72, and the remaining part of the light is reflected from the dichroic mirror 70 to impinge upon a photoresponsive member 74.

The operation of the transducer means shown in FIG. 2 is explained in detail in said first copending United States patent application; however, a general explanation thereof will be given here. The light emitted from the light source 42 is condensed by the lenses 48 and 50, as previously explained, and is transmitted to the probe 30 by the first bundle 52 of optic fibers. The light from the first bundle 52 of fibers is imaged by the lens 60 and passes through the reading end 62 to a spot on the label having a diameter which is less than the width of the color bands thereon. The depth of field of the lens 60 is sufficient to allow reliable reading of the label 26 when the probe 30 is held at various angles to the label 26 by an operator. The light reflected from the label 26 passes through the reading end 62 of the probe and is imaged by the lens 60 on the second bundle 54 of optic fibers, which also terminates in the common plane 58. A fixed number of optic fibers of the second bundle 54 are randomly mixed with an equal number of optic fibers of the first bundle 52 at the common plane 58, and are separated out of the main cable 32, as shown. The optic fibers of the first bundle 52 are shown as plain circles (FIG. 7), and the optic fibers which are included in the second bundle 54 are shown as solid black circles. All of the optic fibers of the first and second bundles 52 and 54, respectively, are secured to the coupling member 56 by an epoxy layer 57. The reflected light from the second bundle 54 of optic fibers is directed to the photoresponsive members 72 and 74, as previously explained.

In the embodiment shown, the photoresponsive members 72 and 74 (FIG. 2) are solid-state photosensors (like Hewlett Packard 5082–4220 Photodiodes) which are selected to be responsive to the spectral characteristics of the color bands used on the label 26. In one embodiment, the color bands used on the label are red, black, and white (which may be the background of the label). The reflected light from the label 26 is split by the dichroic mirror 70 into two components of the visible spectrum. In the system described, only the red and the green spectral components are sensed. The dichroic mirror 70 was selected to reflect the red light from the red bands of color to the photoresponsive member 74. The white light from the white bands on the label 26 is reflected off the mirror 70 to the photoresponsive member 74 and also passes through the mirror 70 to reach the photoresponsive member 72. The photoresponsive member 74 responds to red on the label, both photoresponsive members 74 and 72 respond to white on the label, and both members 74 and 72 do not respond to black on the label. The outputs from the photoresponsive members 72 and 74 are fed into a video processing circuit 76 (to be later described in relation to FIG. 8), which processes said outputs to produce digitized signals corresponding to the color bands white, red, and black. The digitized signals corresponding to white,red, and black color bands are routed from the video processing circuit 76 to logic circuitry designated generally as 78 via lines 266, 267, and 268, respectively.

The major functions performed by the logic circuitry 78 (FIG. 2) include (a) decoding the digitized signals from the video processing circuit 76 into binary bits; (b) storing the decoded bits; (c) identifying the label 26; (d) validating the contents of the label 26; and (e) outputting the label data bits to a data processor 40, a terminal control unit like a cash register 38, or a display device.

The processing of the label data bits by the processor 40 may be conventional and need not be expanded here; consequently it seems appropriate to describe the label 26 in detail.

Figures 3, 3A, 4, 5, 6, 7:
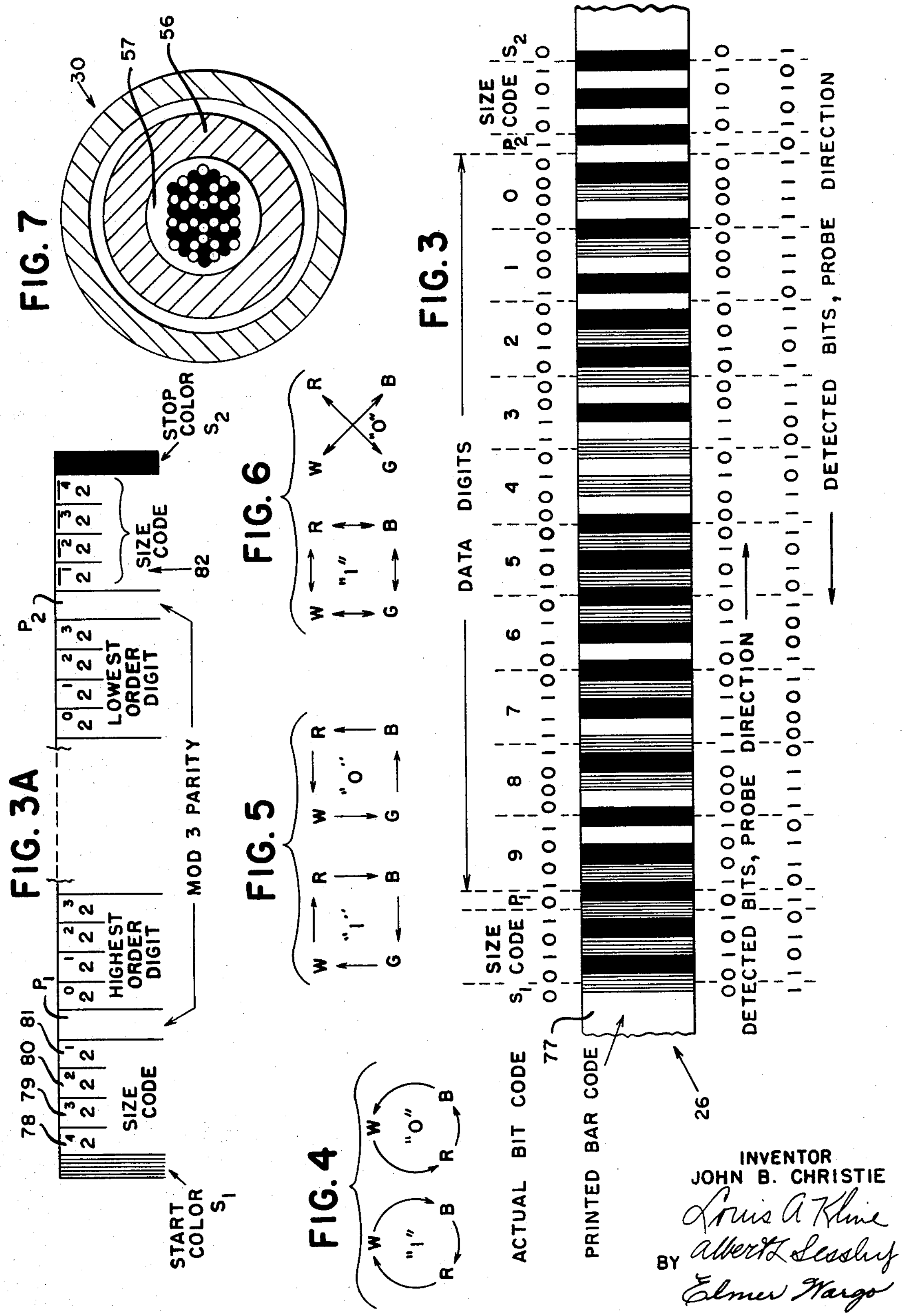
FIG. 3 is an enlarged view of a portion of the record medium of this invention.
FIG. 3*a* is an enlarged view of a portion of the record medium of FIG. 3, showing the location of various codes used on the record medium.
FIG. 4 is a diagram showing one scheme of combining pair groupings of three different indicia means to effect the transitions which correspond to a first datum and a second datum.
FIG. 5 is a diagram showing another scheme of combining pair groupings of four different indicia means to effect the transitions which correspond to a first datum and a second datum.
FIG. 6 is a diagram showing yet another scheme of combining pair groups of four different indicia means to effect the transitions which correspond to a first datum and a second datum.
FIG. 7 is an enlarged cross-sectional view taken along the line 7—7 of FIG. 2, showing the cable used with probe shown therein.

FIGS. 3 and 3a show one embodiment of the label 26 of this invention used in the transition code recognition system. The label includes a white background member 77, on which red bands and black bands of color are printed. At the extreme left of the label (as viewed in FIG. 3) there is a red color band marked $S_1$, and at the extreme right, there is a black color band marked $S_2$. Both these bands of color are start recognition codes and will be described later. The drafting designations for red and black bands used throughout the label are the same as those used for $S_1$ and $S_2$, respectively. The next four bands of color after the start color bands on the left and right sides of the label are used to indicate the size of the code. Each transition from one color band to another in the size code represents a positional weight, as shown in FIG. 3a. For example, in FIG. 3a, the transition in color from band $S_1$ to the band position marked 78 at an unnumbered transition line therebetween represents the number 16 when the detected bit of information for that position is a "1," and, similarly, the transitions for the band positions marked 79, 80, and 81 represent the numbers 8, 4, and 2, respectively. The size code is used to designate any even number of four bit data digits up to thirty. There is a similar size code designated generally as 82 located on the opposite side of the label, as shown, so that the size of the code can be read from either reading direction when the label is being read. The next bands of color, marked $P^1$ and $P_2$, represent transitional codes for a Mod 3 parity which may be used for checking purposes.

The color bands located between the bands of color marked $P_1$ and $P_2$ (FIGS. 3 and *3a*) are used for transitions to represent data digits, with four transitions of four detected bits of data being used to represent each data digit. Ten data digits are shown, although the number of data digits could be varied between two and thirty in multiples of two for the sample label shown. The positional weights assigned to each transition for the detected bits are shown in FIG. *3a*, and the highest order digit is positioned next to $P_1$ and the lowest order digit is positioned next to $P_2$.

One scheme for assigning color transitions to represent a binary "1" and a binary "0" to make up the data included on the label (FIGS. 3 and *3a*) is shown in FIG. 4. The colors used for the transitions in the embodiment shown in FIGS. 3 and 3a are white (W), black (B), and red (R). Because two different adjacent or contiguous colors are necessary for a transition to occur during reading, the named colors are assigned to pair groupings which are assigned a binary value of "1" and a binary value of "0." For example, the transition from white to black (W to B) is indicative of a binary "1." Similarly, a transition from black to red (B to R) and a transition from red to white (R to W) are also indicative of a binary "1." A transition when going in the reverse order, as from white to red (W to R), is indicative of a binary "0." Similarly, a transition from red to black (R to B) and a transition from black to white (B to W) are also indicative of a binary "0."

The color transitions derived from the scheme shown in FIG. 4 are applied to the label shown in FIG. 3 as follows: It is convenient to utilize the background of the label 26 for one of the three colors used; in this instance, the background of the label is white, with black and red color bands printed thereon. Assuming that the normal reading direction is left to right (as viewed in FIG. 3), the first transition detected by the probe 30 (FIGS. 1 and 2) will be a white (from the background 77) to red (W to R) transition for the start code $S_1$. From FIG. 4, a W to R transition is indicative of a binary "0." The next transition detected by the probe 30 when reading in a left-to-right direction will be a transition from red to black (R to B), which from FIG. 4 is indicative of a binary "0." This next transition corresponds to the first digit of the size code. The third transition (FIG. 3) while reading in the same direction stated is a transition from black to red (B to R), which, from FIG. 4, is indicative of a binary "1." The remaining digits are similarly determined until the entire label is scanned, ending with the last transition from black to white (B to W) to the label background, which transition from FIG. 4 is a binary "0." When reading from left to right, asviewed in FIG. 4, the transitions are interpreted by circuitry (to be described later), and the resulting detected bits of data obtained from the transitions are shown directly beneath the label. When the label is read in a right-to-left direction (as viewed in FIG. 3), the color transitions derived are the complements of those derived from reading in a left-to-right direction. As an illustration, when reading from right to left, the probe 30 (FIG. 1) first scans the background of the label, which is white, and then scans the black color band $S_2$. The transition from white to black (from FIG. 4) is indicative of a binary "1" for the start code $S_2$. When reading from left to right, it will be recalled, the transition from the last black band to the white background was a black-to-white transition, which is indicative of a binary "0," which is the complement of the binary "1" derived from a right-to-left reading. The transitions derived from reading from right to left are interpreted by circuitry to be described later, and the resulting detected bits of data obtained from the transitions are shown on the second line beneath the label 26 of FIG. 3. When reading from left to right, as viewed in FIG. 3, the start and finish codes ($S_1$ and $S_2$) are binary "0"s, and, when reading in the opposite direction, the start and finish codes ($S_2$ and $S_1$) are both binary "1"s. By this construction, the label 26 may be read from either direction, and the data will be properly interpreted by circuitry to be described later. It is apparent from FIGS. 3 and 3A that the label 26 if of a single track construction.

Another scheme for assigning indicia transitions to represent a binary "1" and a binary "0" corresponding to data to be recorded on a record medium is shown in FIG. 5. The scheme is useful when four different indicia means are to be used. If the indicia means include four different colors like white (W), red (R), black (B), and green (G), the following transitions may be utilized. A transition from white to red (W to R) when reading in a predetermined reading direction may be indicative of a binary "1." Similarly, transitions from red to black (R to B), black to green (B to G), and green to white (G to W) are also indicative of a binary "1." A transition from white to green (W to G), however, is indicative of a binary "0." Similarly, transitions from green to black (G to B), black to red (B to R), and red to white (R to W) are also indicative of a binary "0." The particular color selected to be recorded on the record medium to effect a transition should always be different from the next adjacent preceding one in a predetermined reading direction.

Still another scheme for assigning indicia transitions to represent a binary "1" and a binary "0" corresponding to data to be recorded on a record medium is shown in FIG. 6. This scheme also utilizes four different indicia means, which, for ease of illustration, may be the same four colors as those shown in FIG. 5. The pair groupings to produce transitions corresponding to a binary "1" are shown in FIG. 6 and include a transition from white to red (W to R) and the reverse transition from red to white (R to W), which are, in effect, bidirectional transitions. Additional pair groupings belonging to the group which produces transitions corresponding to a binary "1" are: red to black (R to B) and black to red (B to R); black to green (B to G) and green to black (G to B); and green to white (G to W) and white to green (W to G). The pair groupings used to produce transitions corresponding to a binary "0" as shown in FIG. 6 are: white to black (W to B) and black to white (B to W); and red to green (R to G) and green to red (G to R). As with the prior examples, the particular color selected to be recorded on the record medium to effect a transition should always be different from the next preceding one in a predetermined reading direction.

Figure 8:
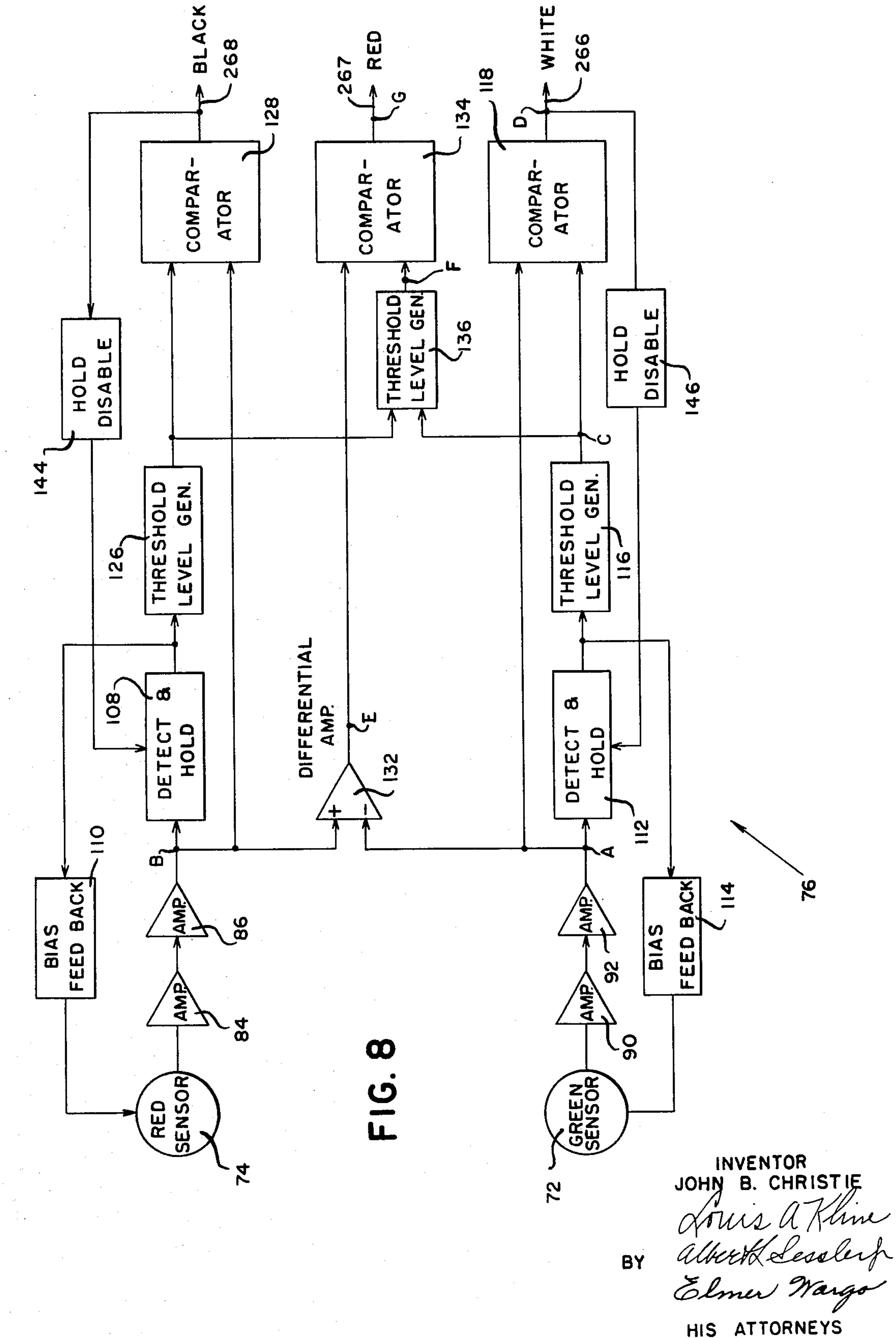
FIG. 8 is a diagram, in block form, of the circuit means used for processing the outputs of the photoresponsive members to produce digitized signals corresponding to the color bands white, red, and black.

The video processing circuit 76 (FIG. 2), alluded to earlier, is shown in more detail in FIG. 8, and it is used to process the outputs of the photoresponsive members 72 and 74 to produce digitized signals corresponding to the color bands white, red, and black which appear on the label 26. To simplify the explanation of the circuit, the photoresponsive member 72 will be called a green sensor, as red is reflected from the mirror 70 (FIG. 2), and the photoresponsive member 74, which receives the reflected red light, will be called the red sensor. The signals derived from the red sensor 74 are amplified in several stages of conventional amplifiers, represented by the amplifiers 84 and 86, and the output of the amplifier 86, as measured at point B in FIG. 8, is shown on FIG. 9 by the curve 88. Similarly, the output of the green sensor 72 is amplified in several stages of conventional amplifiers, represented by the amplifiers 90 and 92, and the output of the amplifier 92, as measured at point A, is shown on FIG. 9 by the curve 94.

Figure 9:
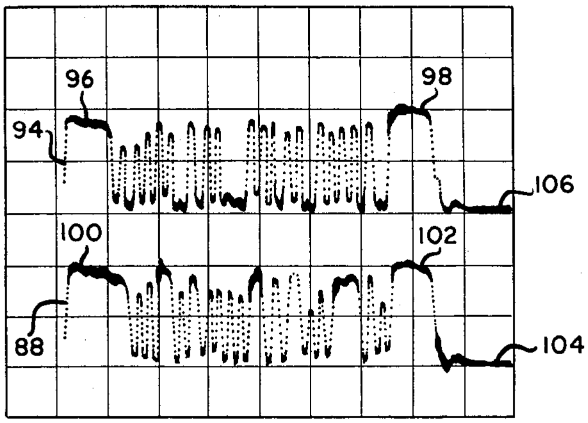
FIG. 9 is a graph showing amplified outputs from the photoresponsive members.

The curves 88 and 94 in FIG. 9 represent the amplified outputs of the red and green sensors 74 and 72, respectively, for scanning the compete length of a label 26. The red sensor (curve 88) responds to both red and white color bands, while the green sensor 72 (curve 94) responds only to white bands. Note the widths of the signals 96 and 98 on curve 94. The wide signal 96 represents the scanning of the white background 77 of the label 26 prior to encountering the start code $S_1$ (FIG. 3), while the wide signal 98 represents the scanning of the white background 77 after the start code $S_2$ is scanned. The extra width of the signal derived from the background when compared to the width of a signal derived from a color band on a label will be used in the logic circuitry 78 (FIG. 2). The curve 88 (FIG. 9), representing the amplified output of the red sensor 74, has signals with a wide width 100 and 102, which occur for the same reason given relative to curve 94. During the scanning of a black band, both curves 88 and 94 drop to a low level, as at 104 and 106, respectively.

The amplifiers 84, 86, 90, and 92 (FIG. 8) are compensated for changes in light, power-supply output, and temperature variations in the following way. The minimum signal level from each amplifier, like the amplifier 86, is detected and stored in a conventional detect and hold circuit 108. A fraction of the minimum signal level is fed back to the associated red sensor 74 by a conventional bias feedback circuit 110 to bias the sensor 74. Because the feedback is negative, the amplifier output bias level is maintained constant. The same technique is applied to the amplifiers 90 and 92 associated with the green sensor 72 by the detect and hold circuit 112 and the bias feedback circuit 114.

The output of the detect and hold circuit 112 (FIG. 8) is fed into a conventional threshold level generator circuit 116, which sets a threshold level at a halfway point between the minimum signal level from the detect and hold circuit 112 and the peak signal obtained from the sensor 72. The output from the generator circuit 116 is fed into a conventional comparator circuit 118. The amplified output from the green sensor 72 (from point A) is also fed into the comparator circuit 118. The comparator circuit 118 is a high gain amplifier which is allowed to saturate in either direction. As soon as the signal level (from A) exceeds the threshold level from the generator circuit 116, a digitized output is produced by the comparator circuit 118, indicating that a white band has been read by the probe 30.

Figure 10:
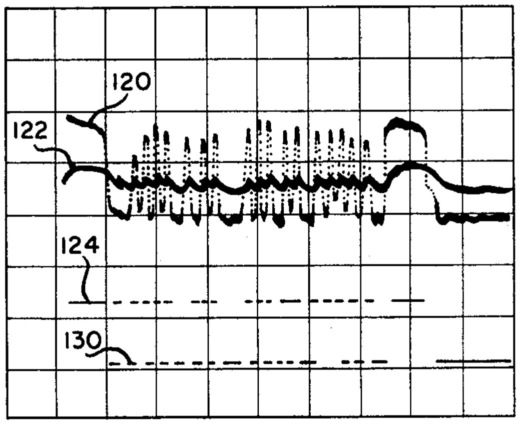
FIG. 10 is a graph showing the amplified outputs from the photoresponsive members as superimposed on their associated threshold levels, and also showing digitized outputs representing white and black bands of colors on a label.

The relationship between actual signal and threshold level for the green sensor 72 (FIG. 8) is shown in the graph in FIG. 10. The actual signal (measured at point A) is shown as a curve 120, which is superimposed on the threshold level shown as a curve 122. The digitized output from the comparator circuit 118 (which represents the white band readings obtained from the probe 30 in scanning an entire label) is obtained at point D (FIG. 8) and is shown at 124 in FIG. 10.

The red sensor (FIG. 8) is used to obtain a digitized output for both the black and the red bands of color appearing on a label 26. A digitized output representing the black bands of color is obtained in the same general manner as was done to obtain a digitized output representing the white bands of color. The output of the detect and hold circuit 108 is fed into a threshold level generator circuit 126 (FIG. 8). Because the red sensor 74 is sensitive to both red and white bands of color, the threshold level in the generator circuit 126 is based upon the "white" signal, as was done in the generator circuit 116 associated with the green sensor 72. The output of the generator circuit 126 is fed into a conventional comparator circuit 128. The amplified signals coming from the red sensor 74 (from point B) are also fed into the comparator circuit 128. Because both red and white signals exceed the threshold level of the generator circuit 126, any signal which is below the threshold level is a black signal. The black signals are actually the complements of the white signals, and this is obvious when looking at the digitized output of the comparator 128, which output is shown at 130 in FIG. 10.

Figure 11:
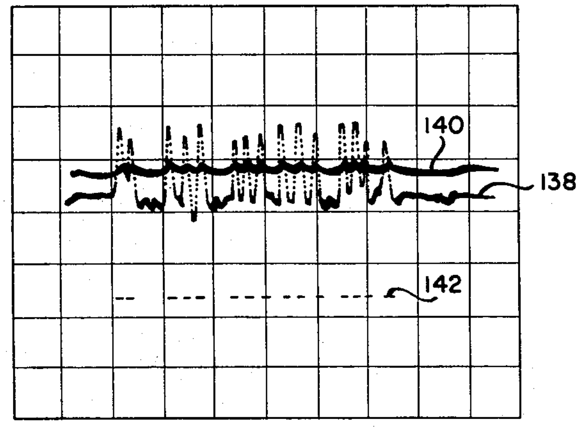
FIG. 11 is a graph showing the amplified output from one photoresponsive member as superimposed on its associated threshold level and the digitized output representing the red bands of color on a label.

The signals corresponding to the red bands of color on a label 26 are derived in the following manner by the video processing circuit shown in FIG. 8. Stated generally, a signal from the green sensor 72 (which is at zero during the reading of a red band) is subtracted from a signal from the red sensor 74, and this resulting value is compared in a comparator. When this resulting value exceeds a threshold level, a digitized output corresponding to the reading of a red band of color is produced. To accomplish the above, the amplified output (from A) of the green sensor 72 is fed into a conventional differential amplifier 132, which also receives the output from B from the amplifier 86 associated with the red sensor 74. The output from the differential amplifier 132 is fed into a conventional comparator circuit 134. The output from the threshold level generator circuit 116 associated with the green sensor 72 and the output from the threshold level generator circuit 126 associated with the red sensor 74 are fed into the conventional threshold level generator circuit 136. The output from the differential amplifier 132 (from point E) is shown as a curve 138 in FIG. 11. The threshold level for the red signals is obtained from the output of the threshold level generator 136 (at point F) and is shown as a curve 140 in FIG. 11. Whenever the output from the differential amplifier 132 (at point E) exceeds the threshold level (curve 140 in FIG. 11), a digitized output occurs at the output of the comparator circuit 134. The digitized output from the comparator circuit 134 (from point G in FIG. 8) is shown as a curve 142 in FIG. 11. The minimum detected signal level for the red sensor 74 is updated continuously whenever a digitized output occurs at the output of the comparator circuit 128. This is accomplished by a conventional feedback hold-disable circuit 144, which connects the output of the comparator circuit 128 to the detect and hold circuit 108 to disable its storage capability. Updating of the green sensor 72 is similarly effected upon the occurrence of an output at the comparator circuit 118 via a conventional feedback, hold-disable circuit 146, which connects the output of the comparator circuit 118 to the detect and hold circuit 112 associated with the green sensor 72.

The output from the video processing circuit 76 (FIGS. 2 and 8), just described, passes over lines 266, 267, and 268 to the logic circuitry 78, where the functions enumerated earlier are performed. The output from the circuitry 78 (FIG. 2) is fed into a data processor 40, where it is conventionally utilized. Additional details of the processing done by the logic circuitry 78 may be found in the above-mentioned second copending United States patent application.

What is claimed is:

1. A record medium for storing data and having indicia scannable in a reading direction comprising:

a record member;

a plurality of at least three different indicia means with each one of said indicia means having detectable characteristics associated therewith;

said indicia means being assigned to predetermined pair groupings so that each of said pair groupings contains two different indicia means;

some of said pair groupings being assigned to a first group so that a transition from the first to the second indicia means of any pair grouping in the first group in a reading direction is indicative of a first datum; and the remainder of said pair groupings being assigned to a second group so that a transition from the first to the second indicia means of any pair grouping in the second group in said reading direction is indicative of a second datum;

said indicia means being selected from said pair groupings and arranged on said record member in a predetermined reading order in a single track to provide said transitions corresponding to said first and second data;

each said indicia means being in the shape of a color bar and arranged on said record member in said predetermined reading order so that the next one of said indicia means in the direction of said reading order is always different from the preceding one of said indicia means; and said transitions also being used for clocking purposes.

2. A record medium for storing coded data and having indicia scannable in a reading direction comprising:

a record member;

first, second, and third indicia means having detectable first, second, and third characteristics, respectively;

said indicia means being arranged on said record member in a reading order so that the next adjacent one of said indicia means in the direction of said reading order is always different from the preceding one of said indicia means to provide a record medium which is self-clocking; and said indicia means being arranged on said member so that any transition from said first to second indicia means, from said second to third indicia means, and from said third to first indicia means in said reading order is representative of a binary one of said data; and any transition from said first to said third indicia means, from said third to said second indicia means, and from said second to said first indicia means is representative of a binary zero of said data;

each said indicia means being in the shape of a single rectangle, with said indicia means being in contacting juxtaposed relation with one another to provide a single track of data to be read by a single track reading means;

said first, second, and third indicia means being the sole means for storing said coded data in a reading order on said record member, and when said coded data is read in a direction opposite from said reading order, the data stored on said record medium is the complement of the data read from said reading order regardless of the particular coded data stored on said record medium.

3. The record medium as claimed in claim 1 further including code means enabling the data stored in said record medium to be read from first and second reading directions which are opposite to each other whereby the data read from said second reading direction is the complement of the data read from said first reading direction.

4. The method of recording data on a record medium comprising the steps of:

selecting a plurality of different indicia means with each one of said indicia means having detectable characteristics associated therewith;

combining said indicia means in predetermined pair groupings so that each of said pair groupings contains two different indicia means;

assigning some of said pair groupings to a first group so that a transition from the first to the second indicia means of any pair groupings in the first group in a reading direction is indicative of a first datum;

assigning the remainder of said pair groupings to a second group so that a transition from the first to the second indicia means of any pair grouping in the second group in said reading direction is indicative of a second datum;

selecting a pair of indicia means from one of said pair groupings in accordance with a datum to be recorded;

recording the selected pair in first and second positions on said medium in a single track in a recording order to obtain the desired transition;

selecting a next indicia means which is different from the one in the second position so that when it is positioned in a third position in said recording order next to the indicia means in said second position, the indicia means in the second and third positions will provide the transition corresponding to the next datum to be recorded on the medium; and repeating said selecting and recording steps to provide said transitions corresponding to said first and second data to be recorded so that a succeeding indicia means recorded on the medium in said recording order is always different from the next preceding one of the indicia means.

5. The method of recording data in a single track on a record medium having a plurality of bit positions comprising the steps of:

selecting at least first, second, and third indicia means having detectable first, second, and third characteristics, respectively;

assigning to said first, second, and third indicia means a first order of transitions to be representative of a first datum of said data;

assigning to said first, second, and third indicia means a second order of transitions to be representative of a second datum of said data;

selecting two of said indicia means corresponding to the desired order of transition to be representative of a datum to be recorded at a particular bit position on said record medium;

recording the two indicia means selected in the selecting step on the record medium in a recording order to effect the desired transition representative of the datum selected to be recorded; and repeating said selecting and recording steps to record the balance of data to be recorded so that a succeeding one of said indicia means recorded on the record medium in said recording order is always different from the next preceding one of the indicia means to effect the transition representative of the datum to be recorded.

6. A record medium for storing coded data and having indicia scannable in a reading direction comprising: a record member;

first, second, and third indicia means having detectable first, second, and third characteristics, respectively;

said indicia means being arranged on said member in a reading order with each indicia means being contiguous with and different from the preceding one of said indicia means in said order;

each of said indicia means being in the form of a single rectangle with contiguous ones of said indicia means contacting to form a transition line therebetween;

said indicia means being arranged on said member so that any transition from said first to second indicia means, from said second to third indicia means, and from said third to first indicia means in said reading order is representative of a binary "one" of said data; and any transition from said first to said third indicia means, from said third to said second indicia means, and from said second to said first indicia means is representative of a binary "zero" of said data;

each of said rectangles representing said indicia means being in aligned parallel relationship to form a single track of data to be read by a single track reading means;

said record member having a white surface used for said first indicia means, and said second and third indicia means being rectangles of second and third colors, respectively;

said first, second, and third indicia means being the sole means for storing said coded data; and said record member having one said transition line between each pair of contiguous indicia means; said transition lines providing a self-clocking record medium.

7. A record medium for storing data in combination with a reader thereof comprising:

a record member;

a plurality of at least three different indicia means with each one of said indicia means having detectable characteristics associated therewith;

said indicia means being assigned to predetermined pair groupings so that each of said pair grouping contains two different indicia means;

some of said pair groupings being assigned to a first group so that said reader recognizes that a transition from the first to the second indicia means of any pair grouping in the first group in a reading direction is indicative of a first datum; and the remainder of said pair groupings being assigned to a second group so that said reader recognizes that a transition from the first to the second indicia means of any pair grouping in the second group in said reading direction is indicative of a second datum;

said indicia means being selected from said pair groupings and arranged on said record member in a predetermined reading order in a single track to provide said transitions corresponding to said first and second data;

each said indicia means being in the shape of a color bar and arranged on said record member in said predetermined reading order so that the next one of said indicia means in the direction of said reading order is always different from the preceding one of said indicia means whereby the regulatory transition from one indicia means to another indicia means provides self clocking.

8. A record medium for storing coded data in combination with a reader thereof comprising:

a record member;

first, second, and third indicia means having detectable first, second, and third characteristics, respectfully;

said indicia means being arranged in said record member in a reading order so that the next adjacent one of said indicia means in the direction of said reading order is always different from the immediately preceding one of said indicia means to provide a record medium which is self-clocking; and said indicia means being arranged on said member so that said reader recognizes that any transition from said first to second indicia means, from said second to third indicia means, and from said third to first indicia means in said reading order is representative of a binary one of said data; and said reader recognizes that any transition from said first to said third indicia means, from said third to said second indicia means, and from said second to said first indicia means is representative of a binary zero of said data;

each said indicia means being in the shape of a single rectangle, with said indicia means being in contacting juxtaposed relation with one another to provide a single track of data to be read by a single track reader;

said first, second, and third indicia means being the sole means for storing said coded data in a reading order on said record member, and when said coded data is read in a direction opposite from said reading order, the data stored on said record medium is the complement of the data read from said reading order regardless of the particular coded data stored on said record medium.

9. The method of recording and reading data on a record medium comprising the steps of:

selecting a plurality of different indicia means with each one of said indicia means having detectable characteristics associated therewith;

combining said indicia means in predetermined pair groupings so that each of said pair groupings contains two different indicia means;

assigning some of said pair groupings to a first group so that a transition from the first to the second indicia means of any pair groupings in the first group in a reading direction is indicative of a first datum to a reader;

assigning the remainder of said pair groupings to a second group so that a transition from the first to the second indicia means of any pair grouping in the second group in said reading direction is indicative of a second datum to a reader;

selecting a pair of indicia means from one of said pair groupings in accordance with a datum to be recorded;

recording the selected pair in first and second positions on said medium in a single track in a recording order to obtain the desired transition;

selecting a next indicia means which is different from the one in the second position so that when it is positioned in a third position in said recording order next to the indicia means in said second position, the indicia means in the second and third position will provide the transition corresponding to the next datum to be recorded on the medium; and repeating said selecting and recording steps to provide said transitions corresponding to said first and second data to be recorded so that a succeeding indicia means recorded on the medium in said recording order is always different from the next preceding one of the indicia means.

10. The method of recording and reading data in a single track on a record medium having a plurality of bit positions comprising the steps of:

selecting at least first, second and third indicia means having detectable first, second, and third characteristics, respectively;

assigning to said first, second and third indicia means a first order of transitions to be representative of a first datum of said data to a reader;

assigning to said first, second and third indicia means a second order of transitions to be representative of a second datum of said data to a reader;

selecting two of said indicia means corresponding to the desired order of transition to be representative of a datum to be recorded at a particular bit position on said record medium;

recording the two indicia means selected in the selecting step on the record medium in a recording order to effect the desired transition representative of the datum selected to be recorded; and repeating said selecting and recording steps to record the balance of data to be recorded so that a succeeding one of said indicia means recorded on the record medium in said recording order is always different from the next preceding one of the indicia means to effect the transition representative of the datum to be recorded.

11. A record medium for storing coded data in combination with a reader thereof comprising: a record member;

first, second, and third indicia means having detectable first, second, and third characteristics, respectively;

said indicia means being arranged in said member in a reading order with each indicia means being contiguous with and different from the preceding one of said indicia means in said order;

each of said indicia means being in the form of a single rectangle with contiguous ones of said indicia means contacting to form a transition line there between;

said indicia means being arranged on said member so that said reader recognizes that any transition from said first to second indicia means, from said second to third indicia means, and from said third to first indicia means in said reading order is representative of a binary "one" of said data; and said reader recognizes that any transition from said first to said third indicia means, from said third to said second indicia means, and from said second to said first indicia means is representative of a binary "zero" of said data;

each of said rectangles representing said indicia means being in aligned parallel relationship to form a single track of data to be read by a single track reader;

said record member having a white surface used for said first indicia means, and said second and third indicia means being rectangles of second and third colors, respectively;

said first, second, and third indicia means being the sole means for storing said coded data; and said record member having one said transition line between each pair of contiguous indicia means; said transition lines providing a self-clocking record medium.

* * * * *